Nov. 3, 1931.  J. R. BARKER  1,830,218
SINGLE TANDEM DISK HARROW
Filed March 2, 1929    4 Sheets-Sheet 1

Inventor
Joseph R. Barker
By Lyon & Lyon
Attorneys

Nov. 3, 1931.  J. R. BARKER  1,830,218
SINGLE TANDEM DISK HARROW
Filed March 2, 1929  4 Sheets-Sheet 2
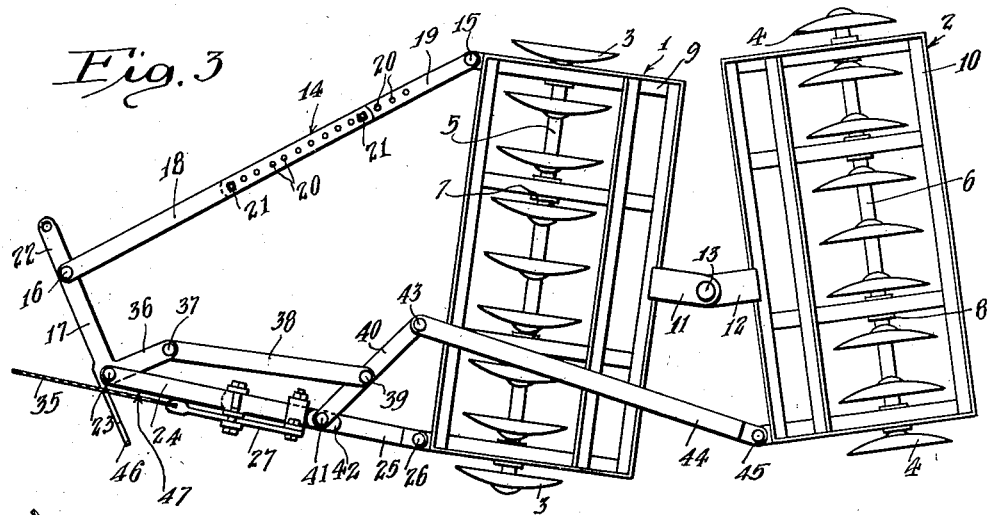
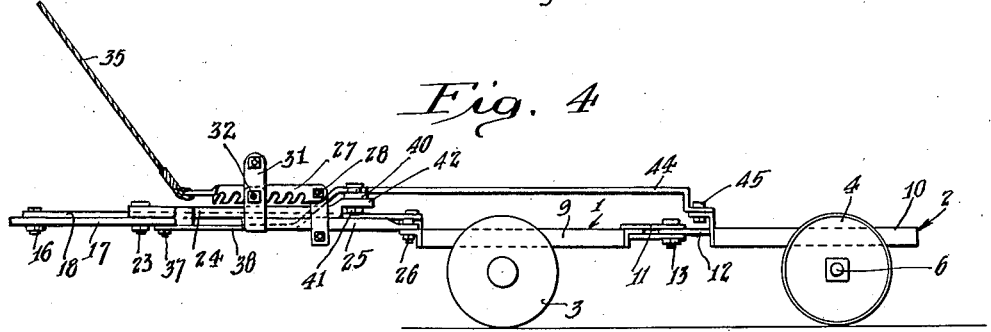
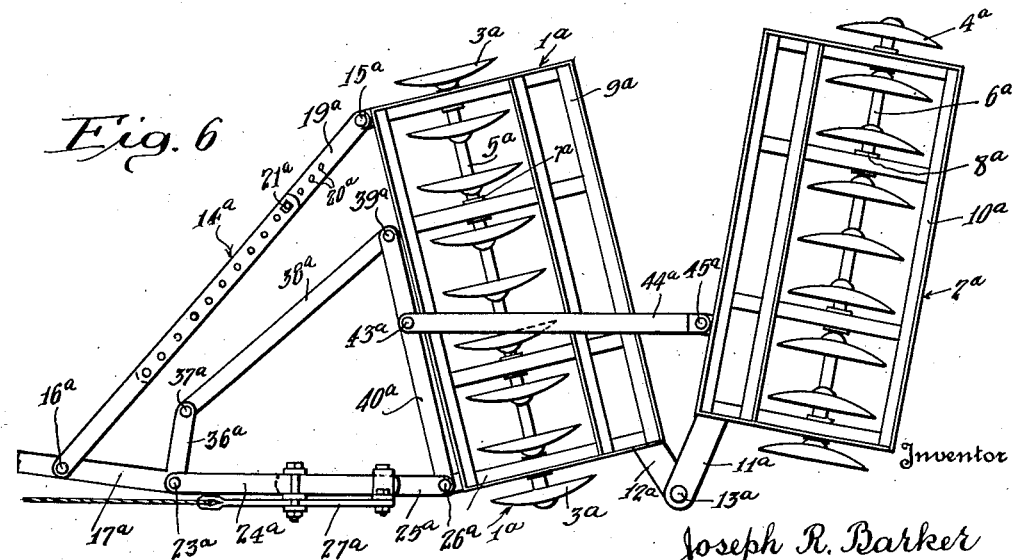
Inventor
Joseph R. Barker
By
Lyon & Lyon
Attorneys

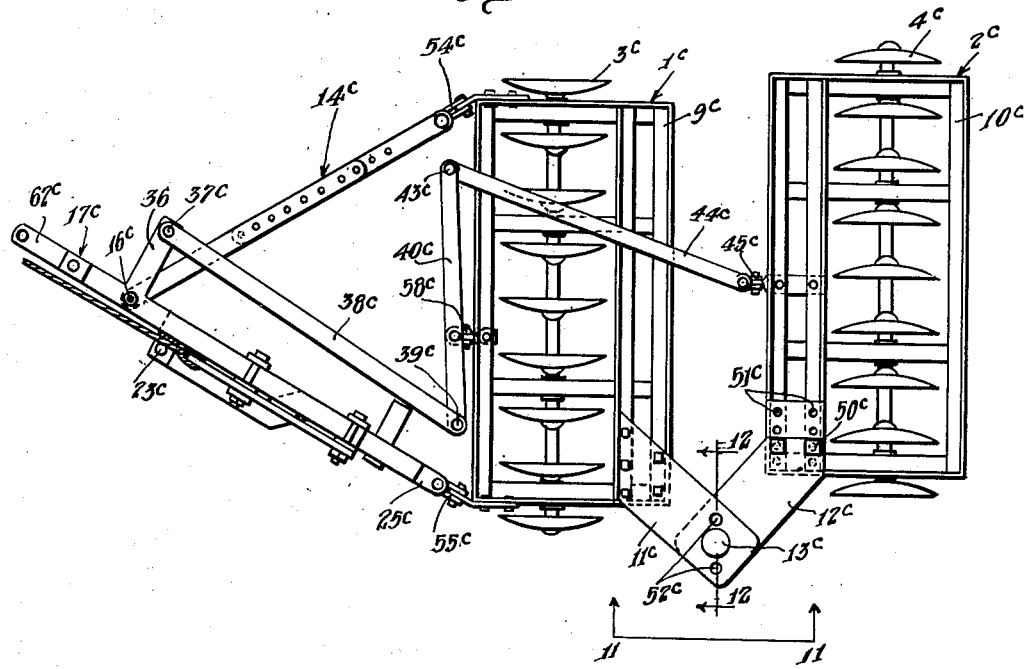
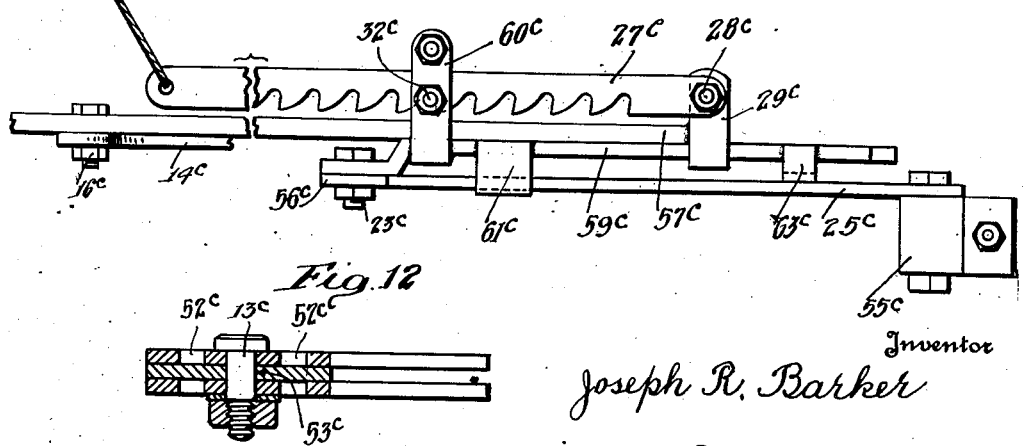

Patented Nov. 3, 1931

1,830,218

UNITED STATES PATENT OFFICE

JOSEPH R. BARKER, OF FALLBROOK, CALIFORNIA, ASSIGNOR TO B. V. CURRY, TRUSTEE

SINGLE TANDEM DISK HARROW

Application filed March 2, 1929. Serial No. 343,984.

This invetnion relates to disk implements, and is more particularly related to a disk implement of the type commonly referred to as a single tandem disk harrow, as for example as is disclosed in the patents issued to Heber F. Towner, Nos. 1,627,355 and 1,627,356, and which include two gangs of disks only and connected together in tandem relation, the disks of each gang being of the concavo-convex type and having their concave sides in the forward gang turned toward one side or end of the implement, and the disks of the opposed gang having their concave sides all turned toward the opposite end or side of the implement.

While disks of this type have gone into extensive use, there has been one serious difficulty in their operation which has greatly retarded their commercial adaptation and has greatly complicated their actual use under operating conditions. This difficulty prior to my invention has been to cause the implements to turn in either direction freely unless resorting to backing of the implement either to move the gangs out of pitch or working angle and then turning the implement, or turning the implement in a manner to cause the gangs to move out of angle or out of operating position and then backing the implement to again place the two gangs in a normal operating or working position. Disk implements of this type have usually been constructed so that when the two gangs are angled the left ends of the respective gangs remain in substantially the same relationship or are in some instances moved closer together while the right ends of the respective gangs move apart; in other words, they have been connected together customarily so that their pivotal connection is located to the left side of the implement. With this particular construction, the difficulty has been in turning such implement to the right or around the open ends of the gangs, because when so turning there is an aggravated tendency of the disks at these open ends to dig into the ground and resist turning. In some cases the pivotal connection between the gangs has been located on the right side of the implement, and in such case the same tendency for the disks to dig into the ground has been in evidence when attempting to turn this implement toward the left. The side of the disk at which the pivotal connection between the gangs is located, whether the pivotal point be actually located at the side or at some other point near the center, is the side of the implement where the gangs on being angled move together, and the open side of the implement around which the difficulty to turn is exhibited is the side of the implement where the gangs move apart as the implement is angled to a working position.

It is, therefore, an object of this invention to provide a single tandem disk harrow which is so constructed that it may be turned freely in either direction as desired or required and may be returned to the operating position with the desired pitch in the disks of the respective gangs without backing the motive power or the implement.

Another object of this invention is to provide a disk harrow of the single tandem type which includes means permitting the free turning of the gangs of disks around the closed ends of the gangs and means for forcing the opened ends of the gangs together while continuing the operation or movement of the implement to permit the implement to be turned around the opened ends of the gangs and for returning the gangs of disks to pitch or working position while the implement is moving, without necessitating the backing or the stopping of the implement to make adjustments.

Another object of this invention is to provide a single tandem disk implement which includes means for turning the disk implement in either direction while the same is traveling ahead and for moving the disks back into pitch or working position while traveling ahead, and means for adjusting the pitch or working position of the disks of each of said gangs.

Another object of this invention is to provide a single tandem disk harrow which includes means for automatically manipulating the gangs of the disks to position to permit the same to turn in either direction while the implement is traveling ahead, and means for adjusting the implement in a manner to cause the same to travel in offset position in relation to the tractor or other motive power without imposing upon the tractor or other motive power undue side-draft.

Another object of this invention is to provide a single tandem disk harrow including two gangs only connected in tandem relation, means for connecting the gangs together in a manner to maintain control of the gangs to cause the disks of the rear gang to cut centers between the furrows cut by the disks of the forward gang, to maintain the gangs vertically as well as horizontally rigid under operative conditions, and means for angling the disks apart at their opposed ends while driving the implement ahead to permit the same to be freely turned in either direction and for returning the gangs of disks to normal operating or angled position while the implement is still traveling ahead.

Other objects of this invention it is believed will be apparent from the following detailed description of a preferred embodiment thereof as illustrated in the accompanying drawings.

In the drawings:

Fig. 3 is a similar top plan view of a disk implement embodying this invention, illustrating the same as manipulated by the tractive force drawing the implement ahead to bring the gangs together at their normally opened ends and permit the implement to be turned freely around the normally opened ends of said gangs.

Fig. 4 is a side elevation of the disk implement as illustrated in Fig. 1.

Fig. 6 is a top plan view of a modified form of disk implement embodying this invention, illustrating the gangs of disks as angled apart to the working position and as in position to be drawn in offset relation to the tractor or motive implement.

Fig. 9 is a top plan view of a modified form of disk implement embodied in this invention.

Fig. 10 is a fragmental elevation on an enlarged scale of the angling bar adjusting means embodied in the modified form of this invention shown in Fig. 9.

Fig. 11 is a fragmental view taken on the line 11—11 of Fig. 9.

Fig. 12 is a sectional view taken substantially on the line 12—12 of Fig. 9.

Figure 1:
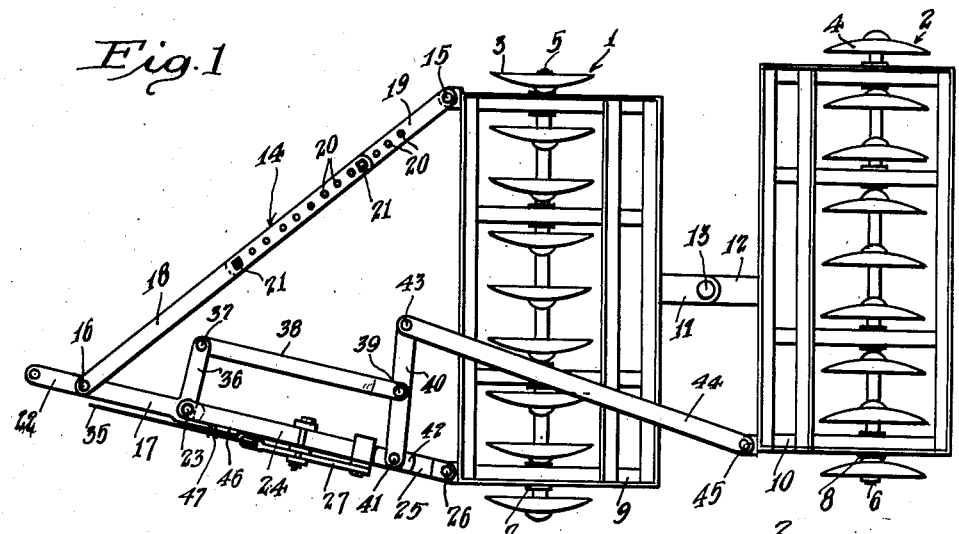
Fig. 1 is a top plan view of a disk harrow embodying this invention, illustrating the same in non-operating or traveling position.

In the modified form of this invention illustrated in Figs. 1 to 5, inclusive, there is illustrated a forward gang of disks 1 and a rearward gang of disks 2. Each of the gangs of disks includes a plurality of disks 3 as mounted in the forward gang and a gang of disks 4 as mounted in the rearward gang. In each case the disks 3 or the disks 4 are mounted upon a gang-rod 5 or 6. Each of the gang rods 5 and 6 is supported in bearings 7 or 8 secured to frames 9 or 10. This portion of the construction is now common to the art. It is as disclosed in the patents issued to Heber F. Towner, aforesaid, the particular manner of construction of the gangs forming no part of this invention. The gangs of disks may be formed in any desired manner well understood in the art. In the forward gang 1 the disks 3 are mounted on the gang rod 5 so that their concave sides are turned toward one end of the gang. In the rearward gang 2 concavo-convex disks 4 are mounted on the gang rod 6 with their concave sides turned toward the end of the gang 2 opposed from that toward which the concave sides of the forward gang are mounted.

Figure 2:
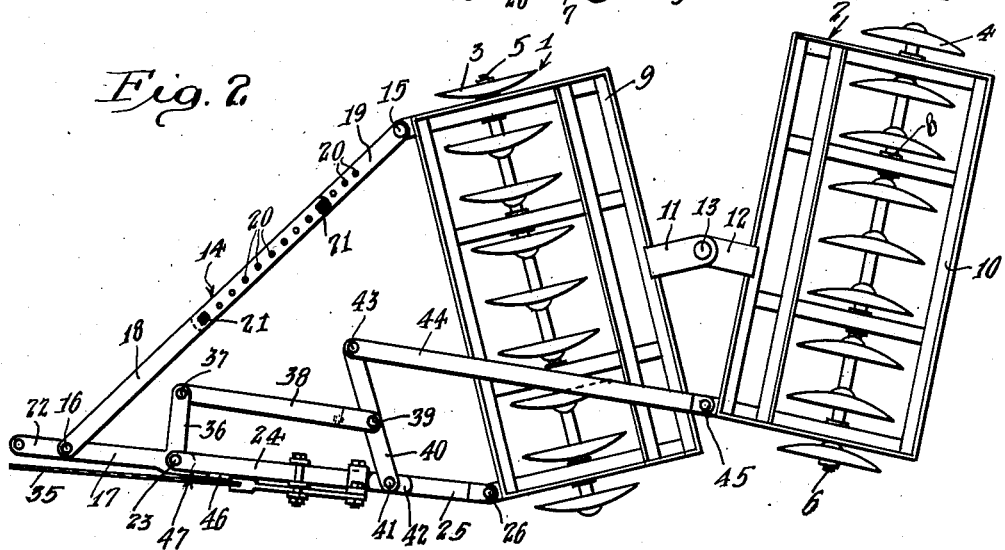
Fig. 2 is a top plan view of the disk implement illustrated in Fig. 1 illustrating the same as in angled or working position and as in position to be drawn in offset relation to a tractor or motive power and also in position to permit the implement to be turned to the left around the ends of the gangs which are normally brought together when the implement is in working or angled position.

Means are provided for pivotally connecting the gangs 1 and 2 together, which means are in this modification illustrated as including a pair of spaced plates 11 which are secured to the frame 9 of the forward gang 1 in a manner to form a bifurcated bracket. A single plate 12 is secured to the rearward gang 2. The single plate 12 fits between the two plates 11 forming the bifurcated bracket and is held in position by means of a vertically extending pivot pin 13. This pivot pin 13 forms a center around which the gangs 1 and 2 turn when being rotated to the working or angled position as illustrated in Fig. 2 or rotated to the non-working but right-turned position illustrated in Fig. 3.

Draft means are provided for connecting the implement composed of the gangs 1 and 2 to a tractor or other draft means and are in this modification illustrated as including a bar 14 which may be termed the offset bar and which is pivotally connected at a pin 15 to one end of the frame 9 of the forward gang and at its opposite end is pivotally connected at a pin 16 to the fulcrumed draft turn lever 17. The offset bar 14 is a divided bar formed of two portions 18 and 19 which are adjustably connected together so as to be longitudinally extensible by any suitable or desirble means. The means herein illustrated include a plurality of spaced holes 20 formed in each of the bars 18 and 19 and through any spaced pair of which holes bolts 21 may be passed to form in any particular adjusted position a longitudinally fixed and rigid offset bar. The manner in which the disk implement embodied in this invention is offset from or to the side of the tractor or draft means depends upon the particular adjustment of the longitudinal length of the offset bar 14, that is, when the gangs are angled to any particular working or angled position.

Figure 5:
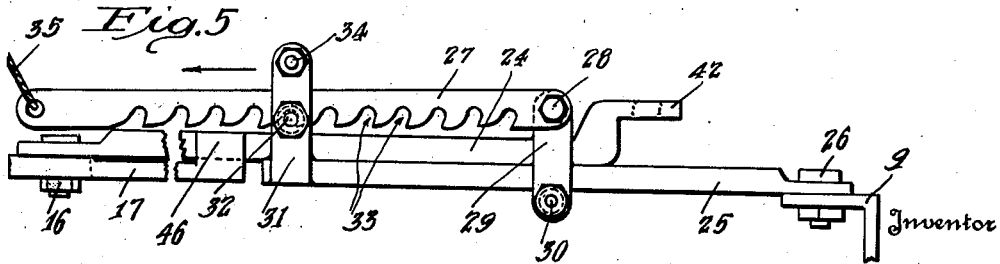
Fig. 5 is an enlarged fragmental view of the adjustable latch mechanism embodied in this invention.

A second draft member of the A or V hitch is illustrated in Figs. 1 to 4, inclusive, is provided, and this member of the hitch is formed of a plurality of elements adjustably and movably connected together in a manner to permit the gangs to be adjusted to angled position, to force the gangs into angled or working position and/or force the gangs out of angled or working position to bring the ends of the gangs together which are normally open when in working position to permit the implement to be turned around these opened ends or to the right as shown in Fig. 5. This member of the hitch includes the fulcrumed draft turn member 17 which is pivotally connected at 16 to the offset bar 14 and extends beyond the pivotal connection 16 to provide an arm 22 which is connected with the draft clevis or yoke bar of the tractor or other draft means. The fulcrum point 23 of the fulcrumed draft turn member 17 is pivotally connected to the hitch bar 24 by a pivot pin. The hitch bar 24 is adjustably connected to a second hitch bar 25 by any suitable means which will permit relative elongation of the member composed of the hitch bars 24 and 25 but will permit the fixing of the combined length of the elements 24 and 25 in any desired adjusted position. The second hitch bar 25 is pivotally connected to the frame 9 of the forward gang at a pivot 26. The manner of connecting the elements of the hitch to the frame 9 of the forward gang may be as desired or as is well understood in the art, such, for example, as by using an adjustable connection to vary the vertical points of connection of the members of this hitch with the forward frame as is specifically illustrated in the patent issued to Herber F. Towner No. 1,627,355.

The particular means herein illustrated for adjustably connecting the elements 24 and 25 together includes the ratchet bar 27 which is pivotally connected by a pin 28 to a bracket 29 secured at a point near the end of the hitch bar 24. The bracket 29 extends downwardly from the hitch bar 24 to provide a slide through which the hitch bar 25 extends. The bracket 29 carries a roller on a pin 30 below the hitch bar 25 so that the hitch bar will slide freely through the bracket 29. Secured to the forward end of the hitch bar 25 is a bracket 31. The bracket 31 carries a ratchet pin 32 which is adapted to be engaged by any one of the teeth 33 to the ratchet bar 27 depending upon the particular adjustment in which it is desired to place the gangs 1 and 2. Secured to the upper end of the bracket 31 is a stop pin 34 which prevents displacement vertically upward of the ratchet bar 27. Secured to the forward end of the ratchet bar 27 is a flexible connecting member or rope 35 which extends forwardly from the implement in a position of access to the operator of the tractor or other draft means which is used to pull the implement forwardly.

Means are provided for moving the gangs 1 and 2 into angled position with any particular or desired adjustment of the offset bar 14 and hitch bars 24 and 25 by the force imparted through the fulcrumed draft turn lever 17 or for moving the gangs to parallel position from such angled position or for forcibly bringing the gangs together at the ends of the gangs which are normally spaced apart under working conditions to permit the implement to be turned around these normally spaced apart ends, which means are herein illustrated as of the following construction: Secured to the arm 36 of the fulcrumed draft turn lever 17 at a pivot pin 37 is a link 38. The link 38 is at its opposite end pivotally connected by a pivot 39 to a fulcrum arm 40. The fulcrum arm 40 is pivotally connected by a pivot 41 to the end 42 of the hitch bar 24. At its opposite end the fulcrum arm 40 is connected at a pivot 43 to a force-actuated bar 44 which extends rearwardly and is connected to the frame 10 of the rearward gang at a point spaced from the pivot 13 by a pivot 45. The pivot 45 is located from the pivot 13 toward the side of the implement at which the ends of the gangs 1 and 2 are brought together when moved to working or angled position with the disks adjusted to a certain working pitch.

In operation the disk harrow as illustrated in Figs. 1 to 5, inclusive, functions as follows:

With the parts adjusted to the position indicated in Fig. 1 which is the "traveling position" or the position in which the gangs are set to travel along without the disks 3 or 4 working, and when it is desired to adjust the gangs 1 and 2 to a working position as shown in Fig. 2, the operator pulls on the flexible rope 35. This pull on the rope 35 releases the ratchet bar 27 from the pin 32, permitting relative elongation of the hitch bar formed of the members 24 and 25. This relative elongation permitted by release of the ratchet bar 27 and the driving head of the tractor means operates through the fulcrumed draft turn lever 17, the link 38, fulcrum bar 40 and force-actuated bar 44 to move the gangs 1 and 2 from the position illustrated in Fig. 1 to the working or angled position illustrated in Fig. 2 with the disks 3 and 4 adjusted to the pitch determined by the particular elongation of the hitch bar formed of the members 24 and 25. The implement is then in position to be operated to disk the soil and as shown in Fig. 2 is adjusted to be drawn into a position offset from the tractor or draft means. In this position when it is desired to turn to the left or around the ends of the gangs which are normally brought together in operating position, the operator merely turns the tractor or draft means to the left and the gangs are brought together at the left end in a manner which will permit turning in this direction. Upon completing the turn the operator merely drives the tractor or draft means ahead and the gangs are still in the proper pitch position as determined by the adjustment in the length of the hitch member formed of the elements 24 and 25. When it is desired to turn the implement to the right or around the open ends of the gangs the operator merely turns the tractor or draft means to the right. Upon driving ahead to make the right turn the gangs 1 and 2 are automatically forced from the position indicated in Fig. 2 to the position indicated in Fig. 3. This automatic operation is accomplished by the rotation of the fulcrumed draft turn lever 17 on the fulcrum point 23. This fulcruming of the lever 17 moves the arm 36 to cause the pin 37 to travel rearwardly. The pin 37 traveling rearwardly forces the lever 38 rearwardly, causing the fulcrum bar 40 to pivot on the pivot 41, moving the force-actuated bar 44 rearwardly, forcing the rear gang 2 at the point of connection by the pivot 45 away from the forward gang 1. The force also applied by the fulcruming of the lever 17 also imparts a force through the draft bars 24 and 25 tending to pull the left end of the forward gang 1 forwardly to separate the gangs 1 and 2 at the left end. This forcing of the gangs 1 and 2 apart at the left end automatically brings the gangs 1 and 2 together at the right end as they pivot around the pivot 13. On continued turning and as the right ends of the two gangs are brought together the disk implement travels freely as turning to the right without causing undue digging in of the disks 3 and 4 of the respective gangs. After the operator has completed the right turn, he merely continues to drive the tractor or draft means ahead, turning the same straight, and as the pulling force is applied to the end of the member 22 of the fulcrumed draft turn lever 17, the reverse action from that just described is followed through, the elements 17, 36, 38, 40 and 44 operating to bring the gangs 1 and 2 back from the position illustrated in Fig. 3 to that illustrated in Fig. 2 or back from the position permitting a free right turn to the angled or working position. The entire operation of making the changes of the positions of the gangs from that illustrated in Fig. 1 to Fig. 2 and from Fig. 2 to Fig. 3 is accomplished while the implement was being driven ahead, without stopping or backing of the implement or tractor. In the modification shown in Figs. 1 to 5, inclusive, there is provided a stop means formed as an extension of the fulcrum lever 17 and as illustrated at 46, which holds the fulcrum lever 17 from being rotated around its fulcrum point 23 beyond a straight line position in relation to the hitch member formed of elements 24 and 25 in order to limit the operation of the hitch and turning means in this direction. The stop member 46 engages the side or edge 47 of the hitch member 24.

In the modified form of this invention illustrated in Fig. 6 like parts are designated with like numerals with the addition of an exponent "a". In this modification the structure is substantially similar with the exception that the fulcrum point 13—a through which the gangs 1—a and 2—b are connected together is located at the ends of the gangs 1—a and 2—a at a point outside of the ends of the disks 3—a and 4—a as specifically illustrated in the Towner patents aforesaid. The manner of connection by the pivot 13—a is formed through spaced plates 11—a which are secured to the frame 10—a of the rear gang forming a bifurcated bracket and a single plate 12—a which is secured to the frame 9—a of the forward gang. The same form of offset bar 14—a is provided as in the modification of this invention illustrated in Figs. 1 to 5, inclusive. A slight re-arrangement of the levers for effecting the movement of the gangs 1—a and 2—a to positions to make a right turn, to angled or working position, or to parallel or non-working position, is required by the movement of the pin 13—a to this position.

The particular arrangement of these parts in this modification is that the fulcrumed draft turn lever 17—a is connected to the hitch bar 14—a at a pin 16—a in the same manner as in the modification shown in Figs. 1 to 5, inclusive, and the lever 17—a is connected at its fulcrum point 23—a to the member 24—a in the same manner. The arm 36—a is connected to a lever 38—a in the same manner at a pivot 37—a. The fulcrum member 40—a is, however, connected at its outer end preferably by the same pivot 26—a by which the hitch bar 25—a is connected to the frame of the forward gang 1—a. The opposite end of the fulcrum bar 40—a is connected at the pin 39—a to the lever 38—a. At an intermediate point the force-actuated bar 44—a is connected by the pin 43—a to the fulcrum lever 40—a. At its opposite end the force-actuated bar 44—a is connected at the pivot of 45—a to the frame 10—a of the rear gang and at a point moved inwardly from the pin 13—a rather than outwardly as illustrated in the previously described modification of this invention.

The members 24—a and 25—a are adjustably longitudinally connected together by means of a ratchet mechanism the same as illustrated in the previously described modification. In operation the two modifications are the same, with the exception that in the modification shown in Fig. 6 it requires a shortening of the free end of the members 24—a and 25—a to move the same into angled or pitch position, while in the first described modification an elongation of the hitch bar formed of the members 24 and 25 is required. Thus it requires a backing of the tractor in order to first adjust the gangs 1—a and 2—a into the desired angled or working position in this second modification, and when driving ahead and when the ratchet which connects the members 24 and 25 is released the gangs 1—a and 2—a may be pulled out of angled position by the draft force.

Figure 7:
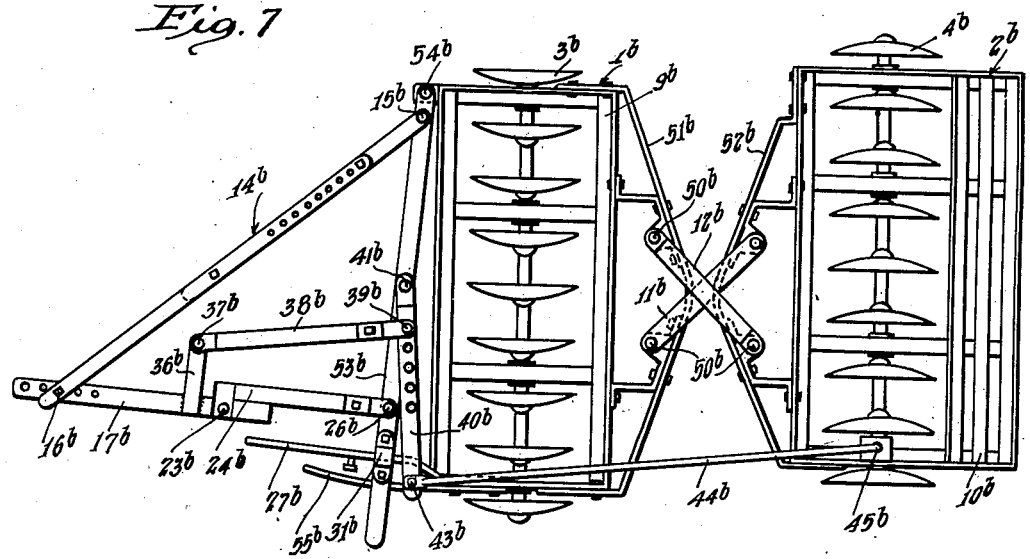
Fig. 7 is a similar top plan view of a third modified form of disk harrow embodying this invention.
Figure 8:
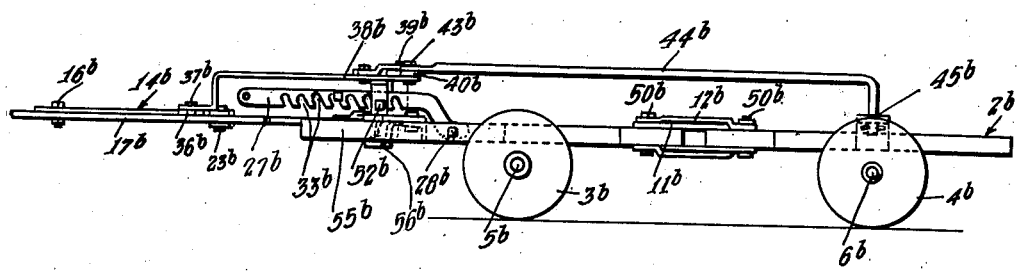
Fig. 8 is a side elevation of the disk implement illustrated in Fig. 7.

In the third modified form of this invention illustrated in Fig. 7, like parts are designated with like numerals with the addition of an exponent "b."

In this instance the frames 9—b and 10—b of the gangs 1—b and 2—b are pivotally connected together by a cross-reach formed of a pair of rigidly connected bars 11—b and 12—b. The opposed ends of the bars 11—b and 12—b are affixed to the respective frames by means of bolts 50—b. In order to provide a pivot with this construction, a pair of curved radius bars 51—b and 52—b are provided which curve away from each other and are connected to the frames of the respective gangs at their ends. This manner of pivotally connecting the gangs 1—b and 2—b together is substantially the same as by using a centrally located pivot 13 as illustrated in Figs. 1 to 3, inclusive. The hitch provided includes an offset bar 14—b which is the same as the offset bar 14 or 14—a. A fulcrumed draft turn lever 17—b is pivotally connected to the offset bar 14—b in the same manner at a pivot 16—b. The fulcrumed draft turn lever 17—b is connected with the draft bar 24—b at a pivot 23—b. The rear end of the hitch bar 24—b is connected to a floating hitch arm 53—b at a pivot 26—b. The floating hitch member 53—b is connected to the frame 9—b of the forward gang 1—b at a pivot 54—b. The offset bar 14—b is pivotally connected to this floating hitch member 53—b at a pivot 15—b. The floating hitch bar 53—b is adjustably connected at its opposite end to the opposite corner of the frame 9—b of the forward gang 1—b by means of a ratchet including a ratchet bar 27—b which is pivotally connected to the frame as indicated at 28—b and fits within a bracket 31—b secured to the floating hitch bar 53—b. The brachet 31—b carries a ratchet pin 32—b adapted to be engaged by any one of the teeth 33—b on the ratchet bar 27—b. The floating bar 53—b is slidably held in vertical position by means of a radius bar 55—b which is secured to the end of the frame 9—b. The floating bar is held in position by means of an angle bracket 56—b secured to the under face of the floating bar 53—b. This manner of adjustment permits a relative elongation or contraction longitudinally of the combined hitch members formed of the member 24—b and the ratchet bar 27—b to effect adjustment of the pitch or working angle of the gangs 1—b and 2—b.

The arm 36—b of the fulcrumed lever 17—b is connected with a link 38—b at a pivot 37—b. The rear end of this lever is connected at a pivot 39—b at an intermediate point of the fulcrum bar 40—b. The fulcrum bar 40—b is pivotally connected at a pin 41—b to the floating arm 53—b. The opposite end of the fulcrum arm 40—b is connected with the force-actuated bar 44—b at a pivot 43—b. The opposed end of the force-actuated bar 44—b is connected to the frame of the rear gang at a pivot pin 45—b.

In operation this third modified form of this invention is entirely similar to the operation of the first modification of this invention previously described.

In the modified form of this invention illustrated in Figs. 9, 10, 11 and 12, similar parts have been designated with similar numerals with the addition of an exponent "c." In this modification the gangs 1—c and 2—c are connected together by means of the pivot 13—c through which practically the entire draft force from the front gang to the rear gang passes in normal operation of the implement. The connection formed by the pivot 13—c is intended to be vertically rigid and for this purpose is formed of a bifurcated bracket formed of a pair of spaced plates 11—c which are secured to the frame of the forward gang 1—c by bolts.

A single plate 12—c fits within the bifurcated bracket formed of the plates 11—c and this plate 12—c is adjustably secured to the frame of the rear gang 2—c by bolts 50—c which are adapted to fit within any desired pair of holes 51—c to adjust the rear gang laterally in relation to the forward gang. By adjusting the rearward gang laterally in relation to the forward gang, the disks 4—c of the rearward gang may be caused to cut in any desired position in relation to the discs 3—c of the forward gang and the gangs may be adjusted when desired so that the disks of the rearward gang accurately cut centers between the disks of the forward gang. The connection thus provided between the forward gang and the rearward gang is also substantially vertically rigid, holding the two gangs from relative tipping action and tending to cause the disks 3—c and 4—c of both gangs to penetrate the soil to the same degree. The vertically rigid connection thus provided causes the weights of the respective gangs to aid each other in holding the disks of the gangs to the proper degree of penetration. As an alternative means of adjusting the rear gang 2—c laterally in relation to the forward gang 1—c, there is illustrated a plurality of holes 52—c formed in the plates 11—c through any set of holes 52—c and the single hole 53—c formed in the plate 12—c the pivot 13—c may be passed.

The draft means provided in this modified form of construction includes an adjustable stay-and-back-up bar 14—c which is pivotally connected through a clevis 54—c with the frame of the forward gang 1—c at one end at its opposite end is pivotally connected at the pin 16—c with the right-turn fulcrum lever 17—c. The angling bar 25—c is connected to the frame of the forward gang through a clevis 55—c at one end and at its opposite end is pivotally connected at the pin 23—c at a right-angle extension 56—c of the draft member 25—c to an extension 57—c of the right-turn draft lever 17—c. The link 38—c is connected at the pivot 37—c with the arm 36—c of the fulcrum right-turn lever 17—c. The link 38—c is at its opposite end connected with the pin 39—c with the multiplier lever 40—c. The multiplier lever 40—c is connected by means of a clevis 58—c to the frame of the forward gang 1—c. The opposite end of the multiplier arm 40—c is connected with the arm 44—c at a pivot 43—c. The other end of the arm 44—c is connected through a clevis 45—c with the frame of the rear gang 2—c. Pivotally mounted on the pin 23—c is a rod 59—c which carries a bifurcated bracket 60—c in which the ratchet pin 32—c is mounted. The extension 57—c of the right-turn fulcrum lever 17—c carries a similar bifurcated bracket 29—c upon which the ratchet bar 27—c is pivoted at the pin 28—c. The arm 59—c slides through the bracket 29—c and the extension 57—c extends through the bifurcated bracket 60—c. The supporting slide 63—c is secured to the arm 59—c to provide a bearing slide for supporting the rear end of the arm 59—c and slides across the upper surface of the arm 25—c.

A stop 61—c is provided which is secured to the arm 59—c in position to engage the edge of the arm 25—c and prevent rotation beyond an overlying position of the arm 59—c over the draft bar 25—c when the implement is turned toward the left and the gangs are open to an angled or working position.

In order to provide means for securing the right-turn fulcrum draft lever to any type of tractor, a hammer strap 62—c is pivotally secured to the end of the fulcrum right-turn lever 17—c.

While I have specifically and in considerable detail described three modified forms of my present invention, it is to be understood that my invention may take other and diverse forms and it is not limited to any or all of the modifications herein set forth but is of the full scope of the appended claims.

I claim:

1. In a single tandem disk implement, the combination of a forward gang of disks, a rearward gang of disks, means connecting said gangs in tandem relation to permit the ends of the gangs to be angled apart at one side of the implement, said connecting means being substantially rigid in a vertical plane when the implement is horizontal and laterally adjustable to vary the cutting relation of disks of the forward and rearward gang, a hitch secured to the forward gang, including an adjustable offset bar, an adjustable angle control means, locking and releasing means for said angle control means, means for controlling said locking and releasing means, a fulcrumed draft turn lever, means for connecting said lever with the angling means and the offset bar, means for connecting said lever to a draft means, and means operatively connecting said lever with the rear gang so that as said lever is turned the gangs will be angled apart or together.

2. In a single tandem disk implement, the combination of a forward gang of disks, a rearward gang of disks, means for connecting said gangs in tandem relation to permit the ends of the gangs to be angled apart at one side of the implement, said connecting means being substantially rigid in a vertical plane when the implement is horizontal, a hitch secured to the forward gang, including an adjustable offset bar, an adjustable angle control means, locking and releasing means for said angle control means, means for controlling said locking and releasing means, a fulcrum draft turn lever, means for connecting the latter said lever with the angling means and the offset bar, means for connecting said lever to a draft means, and means operatively connecting said lever with the rear gang so that as said lever is turned the gangs will be angled apart or together.

3. In a single tandem disk implement, the combination of a forward gang of disks, a rearward gang of disks, means connecting said gangs in tandem relation to permit the ends of the gangs to be angled apart at one side of the implement, a hitch secured to the forward gang including an adjustable offset bar, an adjustable angle control bar, a fulcrum draft turn lever, and means for connecting said lever with the angle control bar and the offset bar, means for connecting said lever to a draft means, and means operatively connecting said lever with the rear gang so that as said lever is turned the gangs will be angled apart or together.

4. In a single tandem disk implement, the combination of a forward gang of disks and a rearward gang of disks, means for connecting said gangs in tandem relation to permit the ends of said gangs to be angled apart at one side of the implement, a hitch secured to the forward gang including adjustable offset means, adjustable angle control means, a fulcrum draft turn lever, means for connecting said lever with the angle control means, means for connecting said lever with the offset means, means for connecting said lever to a draft means, a multiplier lever, means for connecting the multiplier lever with the fulcrum draft turn lever, and means for connecting the multiplier lever with the rear gang of disks so that as the implement is moved ahead the gangs will be brought together at the side of the implement where the gangs are angled apart to a working position to permit the implement to be turned around this side of the implement as the lever is turned, and for returning the gangs to angled working position when the implement is pulled forward after completing the turn.

5. In a single tandem disk implement, the combination of a forward gang of disks, a rearward gang of disks, means connecting said gangs in tandem relation to permit the ends of said gangs to be angled apart at one side of the implement to working position, a hitch secured to the forward gang including an adjustable angle control bar, a fulcrum draft turn lever, means for connecting said lever with the adjustable angle control bar, means for connecting said lever to a draft means, means operatively connecting said lever with the rear gang so that as said lever is turned the gangs will be angled together at the side of the implement where they are normally angled apart to a working position as the implement is moved ahead and turned around said side of the implement and so that as the implement is moved straight ahead the gangs will again be angled apart to working position.

6. In a single tandem disk implement, the combination of a forward gang of disks, a rearward gang of disks, means connecting said gangs in tandem relation to permit the ends of the gangs to be angled apart at one side of the implement to working position, and adjustable angle control bar pivotally secured to the forward gang, latch means permitting longitudinal adjustment of the angle control bar to regulate the working angle of said gangs, a fulcrum draft turn lever, means connecting the fulcrum draft lever with the angle control bar, means connecting said fulcrum draft turn lever with the rear gang, and means for connecting said lever to a draft means so that as said lever is turned as the implement is moved forwardly the gangs will be angled apart or together.

7. In a single tandem disk implement, the combination of a forward gang of disks, a rearward gang of disks, means connecting said gangs in tandem relation to permit the ends of the gangs to be angled apart at one side of the implement to working position, a hitch secured to the forward gang including an adjustable offset bar, an adjustable angle control bar, a fulcrum draft turn lever, means for connecting said turn lever with the angle control bar, means for connecting said draft turn lever with the offset bar, means for connecting said draft turn lever to a draft means, a multiplier bar, means for pivotally mounting the multiplier bar on said forward gang, means for connecting the multiplier bar with the fulcrum draft turn lever, and means operatively connecting the multiplier lever with the rear gang of disks at a point spaced from the connecting means between said gangs.

8. In a single tandem disk implement, the combination of a forward gang of disks, a rearward gang of disks, means connecting said gangs in tandem relation to permit the ends of the gangs to be angled apart at one side of the implement to a working position, a hitch secured to the forward gang including an adjustable offset bar, an adjustable angle control bar, a fulcrum draft turn lever, means for pivotally connecting said lever with the angle control bar, means for pivotally connecting said lever to the offset bar at a point spaced from the pivotal connection of said lever with the angle control bar, means for connecting said lever to a draft means, and means operatively connecting said lever with the rear gang so that as said lever is turned and the implement moved forwardly the gangs will be brought together or angled apart from and to working position.

9. In a single tandem disk implement, the combination of a forward gang of disks, a rearward gang of disks, means connecting said gangs in tandem relation to permit the ends of the gangs to be angled apart at one side of the implement to working position, a pair of hitch bars secured to the forward gang, a fulcrum draft turn lever, means for connecting said lever with each of said hitch bars at spaced points, means for connecting said lever to a draft means, and means operatively connecting said lever with the rear gang.

10. In a single tandem disk implement, the combination of a forward gang of disks, a rearward gang of disks, a single draft pivot holding said gangs in tandem relation to permit the ends of the gangs to be angled apart at one side of the implement to a working position, a pair of hitch bars pivotally secured to the forward gang at spaced points, a fulcrum draft turn lever, means for connecting said lever with one of said hitch bars, means for connecting said lever at its fulcrumed point with the other of said hitch bars, means for connecting said lever at a point outside of said hitch bars with a draft means, and means operatively connecting said lever with the rear gang of disks.

11. In a single tandem disk implement, the combination of a forward gang of disks, a rearward gang of disks, a single draft pivot holding said gangs in tandem relation to permit the ends of the gangs to be angled apart at one side of the implement to a working position, a pair of hitch bars pivotally secured to the forward gang at spaced points, a fulcrum draft turn lever, means for connecting said lever with one of said hitch bars, means for connecting said lever at its fulcrumed point with the other of said hitch bars, means for connecting said lever at a point outside of said hitch bars with a draft means, a multiplier bar, means for pivotally mounting the multiplier bar on the front gang, means for connecting the multiplier bar with the fulcrum draft turn lever, and means for connecting the multiplier bar with the rear gang of disks.

12. In a single tandem disk implement, the combination of a forward gang of disks, a rearward gang of disks, means for connecting said gangs in tandem relation to permit the ends of the gangs to be angled apart at one side of the implement to a working position, a pair of draft bars secured in spaced relation to the forward gang, a fulcrum draft turn lever, means pivotally securing the fulcrum draft turn lever at its fulcrumed point to one of said draft bars, means for pivotally securing one arm of the fulcrum draft turn lever to the other draft bar as a point spaced from the fulcrumed point, means for connecting one arm of the fulcrum draft turn lever to a draft means, and means or operatively connecting the other arm of the fulcrum draft turn lever with the rear gang of disks so that as said lever is turned and the implement is moved forwardly the gangs will be angled apart or together to and from working position.

13. In a single tandem disk implement, the combination of a forward gang of disks, a rearward gang of disks, means for connecting said gangs in tandem relation to permit the ends of the gangs to be angled apart at one side of the implement to a working position, a pair of draft bars secured in spaced relation to the forward gang, a fulcrum draft turn lever, means pivotally securing the fulcrum draft turn lever at its fulcrumed point to one of said draft bars, means for pivotally securing one arm of the fulcrum draft turn lever to the other draft bar at a point spaced from the fulcrumed point, means for connecting one arm of the fulcrum draft turn lever to a draft means, a multiplier bar, means for pivotally mounting the multiplier bar on the front gang, means for connecting the multiplier bar with the fulcrum draft turn lever, and means for connecting the multiplier bar with the rear gang of disks.

14. In a single tandem disk implement, the combination of a forward gang of disks, a rearward gang of disks, means connecting said gangs of disks in tandem relation to permit the ends of said gangs to be angled apart at one side of the implement, a hitch secured to the forward gang including an adjustable offset bar, an adjustable angle control means, locking and releasing means for said angle control means, a fulcrum draft turn lever, means for connecting said lever with the angle control means, means for connecting said lever with the offset bar, means for connecting said lever to a draft means, and substantially rigid means operatively connecting said lever with the rear gang so that as said lever is turned the gangs will be angled apart or together from and to working position as the implement is moved forwardly.

15. In a single tandem disk implement, the combination of a forward gang of concave-convex disks, a rearward gang of concave-convex disks, the disks of the forward gang being mounted in said gang with their concave sides all turned toward one end of the forward gang, the disks of the rearward gang being mounted in the rearward gang with their concave sides turned toward the opposite end of the rearward gang, a single draft pivot connecting said gangs together in tandem relation and so arranged that substantially all of the draft force is transmitted from the forward gang to the rearward gang, and said pivot permitting the gangs to be angled apart at one side of the implement to working position, a hitch secured to the forward gang including an adjustable offset bar, an adjustable angle control bar, locking and releasing means for said adjustable angle control bar, means for controlling said locking and releasing means, a fulcrum draft turn lever, means for connecting the said turn lever with the angle control bar at the fulcrumed point of said turn lever, means for connecting the turn lever with the offset bar at a point removed from the fulcrumed point, means for connecting one arm of the fulcrum draft turn lever with a draft means, and means for operatively connecting the other arm of the fulcrum draft turn lever with the rear gang so that as said lever is turned and the implement moved forwardly the gangs will be angled apart or together to or from working position.

16. In a single tandem disk implement, the combination of a forward gang of concave-convex disks, a rearward gang of concave-convex disks, the disks of the forward gang being mounted in said gang with their concave sides all turned toward one end of the forward gang, the disks of the rearward gang being mounted in the rearward gang with their concave sides turned toward the opposite end of the rearward gang, a single draft pivot connecting said gangs together in tandem relation and through which substantially all of the draft force is transmitted from the forward gang to the rearward gang, and said pivot permitting the gangs to be angled apart at one side of the implement to working position, a hitch secured to the forward gang including an adjustable offset bar, an adjustable angle control bar, locking and releasing means for said adjustable angle control bar, means for controlling said locking and releasing means, a fulcrum draft turn lever, means for connecting the said turn lever with the angle control bar at the fulcrumed point of said turn lever, means for connecting the turn lever with the offset bar at a point removed from the fulcrumed point, means for connecting one arm of the fulcrum draft turn lever with a draft means, a multiplier lever, means for pivotally supporting the multiplier lever, means for connecting the multiplier lever with the other arm of the fulcrum draft turn lever, and means for connecting the multiplier lever with the rear gang.

Signed at Santa Ana, California, this 24th day of January, 1929.

JOSEPH R. BARKER.